United States Patent
Bederov

(10) Patent No.: US 9,247,576 B2
(45) Date of Patent: Jan. 26, 2016

(54) METHOD FOR CONTROLLING AND MANAGING A WIRELESS CONNECTION FOR DATA COMMUNICATION BETWEEN A MOBILE DEVICE AND A BROADBAND RADIO NETWORK

(71) Applicant: Orderman GmbH, Salzburg (AT)

(72) Inventor: Denis Bederov, Berlin (DE)

(73) Assignee: NCR Corporation, Duluth, GA (US)

( * ) Notice: Subject to any disclaimer, the term of this patent is extended or adjusted under 35 U.S.C. 154(b) by 253 days.

(21) Appl. No.: 13/794,984

(22) Filed: Mar. 12, 2013

(65) Prior Publication Data
US 2014/0011475 A1 Jan. 9, 2014

(30) Foreign Application Priority Data
Jul. 5, 2012 (EP) .................................... 12175065

(51) Int. Cl.
*H04W 76/04* (2009.01)
*H04L 29/06* (2006.01)
*H04W 12/06* (2009.01)
*H04W 88/10* (2009.01)

(52) U.S. Cl.
CPC .............. *H04W 76/04* (2013.01); *H04L 63/18* (2013.01); *H04W 12/06* (2013.01); *H04W 88/10* (2013.01)

(58) Field of Classification Search
CPC ............. G06Q 20/40; G06Q 20/4012; G06Q 20/4014; H04L 63/18; H04L 9/32; H04L 9/3226; H04L 9/3228; H04L 9/3263; H04L 29/12245; H04L 61/203; H04L 63/08; H04L 67/146; H04L 12/28; H04L 12/2801; H04L 12/46; H04L 12/4612; H04L 12/4625; H04W 12/00; H04W 12/06; H04W 12/08; H04W 12/10; H04W 12/12; H04W 4/02; H04W 76/04; H04W 88/10; H04W 76/062; H04W 76/064; H04W 76/066

USPC .......... 455/410–411, 415, 434, 435.1, 452.2, 455/511, 517, 550.1, 552.1, 553.1, 455/554.1–554.2, 555, 556.1–556.2, 455/557–558, 561; 370/0.328, 338, 395.5, 370/395.52, 468, 913; 709/219, 225, 228, 709/229

See application file for complete search history.

(56) References Cited

U.S. PATENT DOCUMENTS

| | | | |
|---|---|---|---|
| 6,870,808 B1 * | 3/2005 | Liu et al. | 370/203 |
| 2003/0167337 A1 * | 9/2003 | Liew et al. | 709/231 |
| 2004/0224719 A1 * | 11/2004 | Nounin | H04B 1/406 455/553.1 |
| 2006/0135200 A1 * | 6/2006 | Yun et al. | 455/552.1 |
| 2007/0213033 A1 * | 9/2007 | Alper et al. | 455/411 |
| 2008/0090595 A1 * | 4/2008 | Liu et al. | 455/461 |
| 2008/0205345 A1 * | 8/2008 | Sachs | H04W 36/0011 370/332 |
| 2008/0235376 A1 * | 9/2008 | Prytz et al. | 709/225 |
| 2009/0036159 A1 * | 2/2009 | Chen | 455/556.1 |
| 2009/0259746 A1 * | 10/2009 | Sasaki | 709/224 |
| 2010/0128696 A1 * | 5/2010 | Fantini | H04L 29/12028 370/331 |
| 2011/0222466 A1 * | 9/2011 | Pance | H04Q 3/0029 370/316 |

FOREIGN PATENT DOCUMENTS

KR 10-2006-0106038 * 10/2006 ............... H04B 7/26

* cited by examiner

*Primary Examiner* — Meless Zewdu
(74) *Attorney, Agent, or Firm* — Schwegman, Lundberg, Woessner

(57) ABSTRACT

A method for controlling and managing a wireless connection for data communication between a mobile device and a broadband radio network is suggested, in the context of which method, the log in and the authentication of the mobile device at the base stations of the broadband radio network takes place via a narrow band radio network with lower data rate and larger range than the broadband radio network.

6 Claims, 2 Drawing Sheets

METHOD FOR CONTROLLING AND MANAGING A WIRELESS CONNECTION FOR DATA COMMUNICATION BETWEEN A MOBILE DEVICE AND A BROADBAND RADIO NETWORK

FIELD OF THE INVENTION

The present invention relates to a method for controlling and managing a wireless connection for data communication between a mobile device and a broadband radio network.

BACKGROUND

It is known from the prior art to equip mobile devices for data communication with radio units for different radio networks with different radio standards, as a result of which these devices can support different radio standards.

Different radio standards have different quality parameters, such as for example range, data rates, etc. Generally, radio standards which guarantee a large range have a low bandwidth and thus a low transmission rate or data rate, wherein radio standards with a high bandwidth and thus with a high transmission rate or data rate have a smaller range and thus coverage compared to narrow band radio standards.

Broadband in this case represents transmissions with higher data rates, narrow band represents transmissions with somewhat lower data rates. This colloquial definition is based on the observation that one also tends to consume more space in the spectrum when transmitting more data in the same unit of time. A narrow band radio network (i.e. a radio network based on a narrow band radio standard) in the sense of the invention has a larger range and a lower data rate than a broadband radio network.

A plurality of base stations or relatively small cells are necessary in order to ensure good coverage in the case of radio standards with high bandwidth. Due to the low range of broadband systems, it is ensured that less interference loads the transmission path, as a result of which transmission errors are largely prevented.

In the event that at a location, a wireless connection between a mobile device and radio networks is possible via different radio standards, according to the prior art, hard switching between the different radio standards takes place as a function of requests with respect to the coverage, the transmission costs, the signal quality, etc. Here, the existing connection via one radio standard is deactivated, whilst another connection via another radio standard is activated.

This may disadvantageously lead to no wireless connection being present for a certain time during the switching from one radio standard to another radio standard, so that dead times result, as the mobile device first has to perform a log in and/or authentication in the case of the radio network to be used.

Further, it is known in the case of the availability of a plurality of radio networks with different radio standards to only deactivate an existing connection via one radio standard if another connection via another radio standard is established. As, however, the time of the breaking of the existing connection cannot be established exactly, this procedure can likewise result in dead times.

Furthermore, due to the short range of broadband radio standards, it is necessary to frequently change the base stations of a broadband radio standard, for example of a WLAN system, which disadvantageously results in an overlapping of the frequency ranges of the base stations one the one hand, which can lead to interferences, and results in dead times on the other hand, as the mobile device must first seek a new base station and carry out a log in and/or authentication if the contact to the previous base station is already interrupted.

SUMMARY

The present invention is based on the object of specifying a method for controlling and managing a wireless connection for data communication between a mobile device and a broadband radio network, the carrying out of which means that the mentioned dead times in data transmission during a base station change, which are known from the prior art, are prevented. Furthermore, the security of the data transmission should be increased.

This object is achieved by the features of claim 1. Further advantageous embodiments and advantages according to the invention emerge from the sub-claims.

Thus, a method for controlling and managing a wireless connection for data communication between a mobile device and a broadband radio network is suggested, in the context of which, the log in and, in the event that an control is necessary, the authentication of the mobile device at the base stations of the broadband radio network takes place via a narrow band radio network with lower data rate and larger range than the broadband radio network. Here, the required antenna/channel scan and the log in and authentication of the mobile device at the base stations of the broadband radio network take place in advance via the narrow band radio network. For example, frequency lists, required spread codes/modulation parameters, temporary user IDs, etc. can be exchanged via the narrow band radio network.

It is a prerequisite here that the mobile device is already logged in at the narrow band network so that a connection exists for data communication between the mobile device and the narrow band radio network.

An exemplary sequence for such an authentication is illustrated in the following:

The following steps take place on the narrow band radio network:

1. The mobile device sends an authentication request to the base station.
2. The base station requests a password from the mobile device.
3. The mobile device sends the password to the base station.
4. The base station checks the password.
5. The base station generates diverse information, such as for example a random number for identifying the subsequent valid communication (session token) or the number of the radio channel to be used or the values of the physical modulation parameters and sends the same to the mobile device.
6. The mobile device uses these parameters for configuring the following broadband communication, i.e. the data communication via the broadband radio network.

Subsequently, further communication takes place on the broadband radio network. In particular, radio traffic uses the radio channel likewise transmitted in step 5 and the session token transmitted in step 5.

This exemplary sequence is only used for the simplified illustration of such a narrow band authentication with subsequent broadband communication. The method according to the invention covers all forms of authentication in a broadband radio network via a narrow band radio network.

By means of the concept according to the invention, the advantage is achieved that the mobile device is already expected in each cell of the broadband radio network assigned to a base station, so that no dead times result, as a result of which the data transmission can be carried out advantageously without delay.

For example, the broadband radio network can have five base stations which are covered by only one base station of the narrow band radio network.

In the context of a development of the invention, it is additionally suggested to achieve an increase of the overall security by carrying out the "key exchange" procedure for the cryptographic keys, which are required for the encryption of the transmission via the broadband radio network, via the narrow band radio network.

An exemplary sequence for such an authentication is illustrated in the following:

The following steps take place on the narrow band radio network:

1. The mobile device sends an authentication request to the base station.
2. The base station requests a password from the mobile device.
3. The mobile device sends the password to the base station.
4. The base station checks the password.
5. The base station generates cryptographic information for the broadband radio network together with other information, such as a random number for identifying the subsequent valid communication (session token) or the number of the radio channel to be used or the values of the physical modulation parameters and sends the same to the mobile device
6. The mobile device uses these parameters for configuring the following broadband communication From then, further communication takes place on the broadband radio network In particular, the data to be transmitted is encrypted with the cryptographic information transmitted in step 5 and the radio traffic takes place on the radio channel likewise transmitted in step 5.

This exemplary sequence is only used for the simplified illustration of such a narrow band authentication with subsequent broadband communication. The method according to the invention covers all forms of authentication in a broadband radio network via a narrow band radio network.

Thus, the keys for the encrypted data transmission via the broadband radio network, which for example can be a WLAN network, are exchanged via the narrow band radio network, wherein the encrypted data transmission takes place via the broadband radio network. In this context, the narrow band radio network represents an independent data transmission channel, so that an increase of the security can be achieved by means of the transmission of the keys via the narrow band radio network and the data transmission via the broadband radio network.

In the context of a development of the method according to the invention, the data stream to be transmitted can be split. Here, data fragments of the data to be transmitted via the broadband radio network are cut out and transmitted via the slower narrow band radio network, wherein the data transmitted by both radio networks are reassembled at the receiver. The correct assembling of these data is based on a corresponding flow control. A concrete example for such a flow control is that before the sending, each data packet receives a clear increasing packet number, independently of whether the data packet is transmitted on the broadband or the narrow band radio channel. The receiver collects the data packets of both radio channels and arranges them according to their rising packet number to form a complete correct data stream again.

Furthermore, provision may be made in the context of the invention for control information to be transmitted via the narrow band radio network, which control information is used for transmitting the actual data to be transmitted via the broadband radio network. As a result, a faster transmission is achieved, as the control information is transmitted simultaneously with the data to be transmitted.

Further, according to the present invention, the performance of the broadband radio network can be determined via ongoing measurements carried out at predetermined time intervals on the basis of a comparison with the essentially constant performance of the narrow band radio network, wherein in the event that the performance of the transmission path of the broadband radio network falls below a predetermined threshold value, the data transmission of all of the data to be transmitted or a part of the data to be transmitted takes place via the narrow band radio network until the performance of the broadband radio network exceeds a predetermined threshold value. In the context of a variant of the invention, in the event of a poor performance of the broadband radio network, only the non-security-critical data are transmitted via the narrow band radio network.

In the event of a failure or the unavailability of the broadband radio network, the entire data transmission is performed via the narrow band radio network, as a result of which failure safety is increased.

Due to the concept according to the invention, a broadband radio network is combined with a narrow band radio network, as a result of which more advantages result than in the case of the optionally exclusive use of one of these two networks.

The broadband radio network is preferably realized as a WLAN radio network (in accordance with one of the IEEE802.11 standards), wherein the narrow band radio network is preferably realized as a radio network over the ISM band (industrial, scientific and medical band), preferably however at a frequency of 433 or 902 MHz.

BRIEF DESCRIPTION OF THE DRAWINGS

The invention is explained in more detail by way of example in the following on the basis of the attached figures. The figures show as follows.

DETAILED DESCRIPTION

Figure 1:
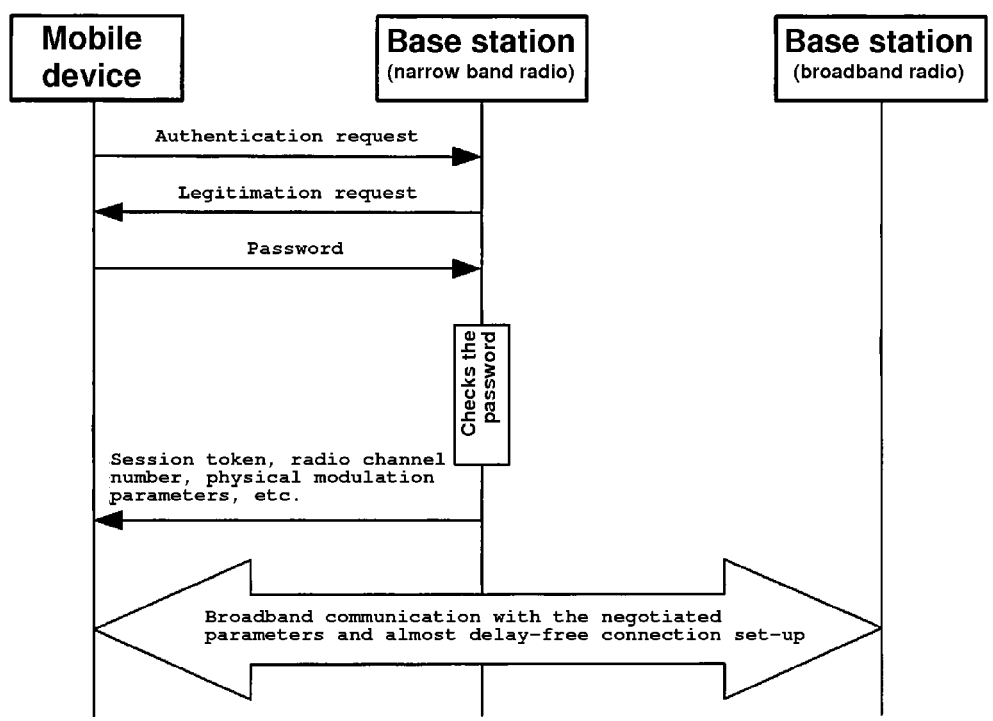
FIG. 1: a diagram for illustrating the authentication of a mobile device at a base station of a broadband radio network via a narrow band radio network with lower data rate and larger range than the broadband radio network according to an embodiment of the invention.

With reference to FIG. 1, the mobile device sends an authentication request for the broadband radio network to the base station of the narrow band radio network, which is designated in the attached figure as narrow band radio. Subsequently, a legitimation request is sent by the base station of the narrow band radio network to the mobile device, i.e. a password for the broadband network is requested. After the sending of the password to the base station of the narrow band network, the password is checked by the base station, wherein in the event of a valid password, the information necessary for data communication via the broadband radio network, such as for example a random number for identifying the subsequent valid communication (session token) and/or the number of the radio channel to be used and/or the values of the physical modulation parameters, is made available by the base station of the narrow band radio network and sent to the mobile device which uses this information for configuring the subsequent broadband communication with the base station of the broadband radio network, which is designated as broadband radio in the attached figure.

The information necessary for data communication via the broadband radio network can be generated by the base station of the narrow band radio network or be stored in the base station or on a server and called up by the base station.

The physical modulation parameters are dependent on the respective technology of the broadband radio network. For example, the physical modulation parameters may be defined spread codes.

The narrow band and the broadband radio networks communicate with one another on a higher level, so that the parameters necessary for data communication via the broadband radio network, such as the password, the information necessary for data communication via the broadband radio network and the values of the physical modulation parameters can be transmitted by the base station of the narrow band radio network to the handset. By means of the communication of both radio networks, it is additionally ensured that the mobile device is already expected in each cell of the broadband radio network assigned to a base station.

A central server, which controls both the narrow band and the broadband radio networks, represents an exemplary scenario for such a communication on a higher level. In the above-cited exemplary sequence for an authentication, the server would make the authentication password available to both radio networks.

Figure 2:
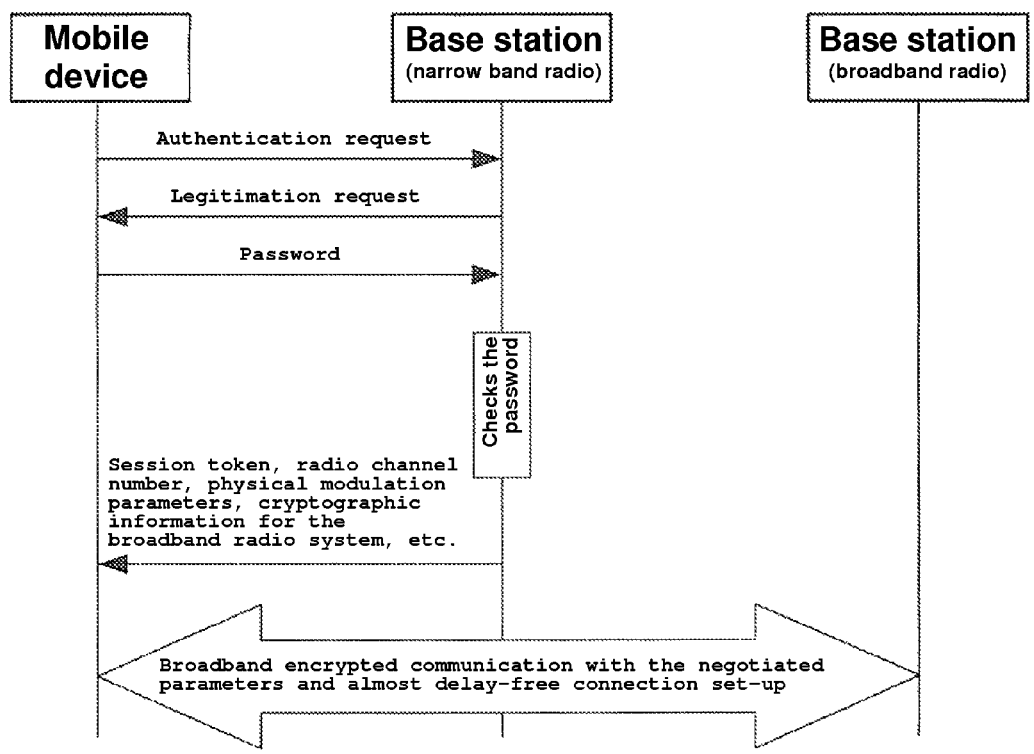
FIG. 2: a diagram for illustrating the authentication of a mobile device at a base station of a broadband radio network via a narrow band radio network with lower data rate and larger range than the broadband radio network according to a further advantageous embodiment of the invention, wherein to increase the security, the "key exchange" procedure for the cryptographic keys, which are necessary for encrypting the transmission via the broadband radio network, is carried out via the narrow band radio network.

The subject matter of FIG. 2 is an authentication, in which to increase security, the "key exchange" procedure for the cryptographic keys, which are required for the encryption of the transmission via the broadband radio network, is carried out via the narrow band radio network. This variant differs from the variant according to FIG. 1 in that following the sending of the password to the base station of the narrow band radio network and checking of the same, in the event of a valid password, in addition to the random number for identifying the subsequent valid communication (session token) and/or to the number of the radio channel to be used and/or to the values of the physical modulation parameters, the cryptographic information, which is required for encrypting the transmission via the broadband radio network, is sent by the base station to the mobile device. The cryptographic information is dependent on the respective cryptographic method. In the simplest case, the password is sent as cryptographic information, with which the data are encrypted.

The method presented here can for example be carried out in the case of a radio ordering system for the catering trade. Systems of this type have a plurality of handsets, which are used by service personnel in the guest area for example in order to forward an order to a computer system. According to the invention, provision is made in such systems for the data communication of the handsets with the computer system of the radio ordering system to take place in accordance with the method according to the invention. For this purpose, the radio ordering system has at least one base station of a narrow band radio network and a plurality of base stations of a broadband network.

Further, the method according to the invention can also be applied if the mobile device does not move and the base stations of the broadband and/or of the narrow band radio network move or if the mobile device and the base stations of the broadband and/or of the narrow band radio network move.

The invention claimed is:

1. A method for controlling and managing a wireless connection for data communication between a mobile device and a broadband radio network, characterized in that a log in and authentication of the mobile device at base stations of the broadband radio network takes place via a narrow band radio network with lower data rate and larger range than the broadband radio network, and characterized in that a performance of the broadband radio network is determined via ongoing measurements carried out at predetermined time intervals on the basis of a comparison with a constant performance of the narrow band radio network, wherein in an event that the performance of the broadband radio network falls below a predetermined threshold value, the data transmission of all data to be transmitted or a part of the data to be transmitted takes place via the narrow band radio network until the performance of the broadband radio network exceeds a predetermined threshold value.

2. The method for controlling and managing the wireless connection for data communication between the mobile device and the broadband radio network according to claim 1, characterized in that a required antenna/channel scan and the log in and authentication of the mobile device at the base stations of the broadband radio network take place in advance via the narrow band radio network.

3. The method for controlling and managing the wireless connection for data communication between the mobile device and the broadband radio network according to claim 1 or 2, characterized in that a key exchange procedure for the cryptographic keys, which are necessary for encrypting the transmission via the broadband radio network, is carried out via the narrow band radio network, wherein the encrypted data transmission takes place via the broadband radio network.

4. The method for controlling and managing the wireless connection for data communication between the mobile device and the broadband radio network according to claim 1, 2 or 3, characterized in that data fragments of the data to be transmitted via the broadband radio network are cut out and transmitted via the narrow band radio network, wherein the data transmitted by both radio networks are reassembled at the receiver.

5. The method for controlling and managing the wireless connection for data communication between the mobile device and the broadband radio network according to claim 1, 2, 3 or 4, characterized in that control information is transmitted via the narrow band radio network, which control information is used for transmitting the actual data to be transmitted via the broadband radio network.

6. The method for controlling and managing the wireless connection for data communication between the mobile device and the broadband radio network according to claim 1, 2, 3, 4, or 5, characterized in that the broadband radio network is preferably realized as a WLAN radio network in accordance with one of the IEEE802.11 standards, wherein the narrow band radio network is preferably realized as a radio network over the ISM band.

* * * * *